(No Model.)

W. VALENTINE.
TIRE UPSETTER.

No. 278,836. Patented June 5, 1883.

Attest:
J. Walter Fowler
J. M. Tinkler

Inventor:
W<sup>m</sup> Valentine
by Dewey & Co
attys

UNITED STATES PATENT OFFICE.

WILLIAM VALENTINE, OF REDDING, CALIFORNIA.

TIRE-UPSETTER.

SPECIFICATION forming part of Letters Patent No. 278,836, dated June 5, 1883.

Application filed September 5, 1882. (No model.)

*To all whom it may concern:*

Be it known that I, WILLIAM VALENTINE, of Redding, county of Shasta, State of California, have invented an Improved Tire-Upsetter; and I hereby declare the following to be a full, clear, and exact description thereof.

My invention relates to a new and useful tire-upsetter; and it consists in a stationary block having a fixed and a movable jaw, and a sliding block having similar jaws, though oppositely placed, and an intervening lever so connected with the movable jaws that by its movement in one direction it separates the sliding from the stationary block after swinging open the movable jaws, and by its movement in the reverse direction it draws the sliding block with its jaws to the stationary block, having previously closed the movable jaws, as will hereinafter fully appear.

The object of my invention is, broadly, to shrink, or, as it is commonly called, "upset" tires. This is a well-known operation, consisting in gripping the tire in two places and forcing the gripping devices together, whereby the tire is thickened, and consequently shortened to render it smaller in diameter.

The particular object of my invention is to provide a convenient and effective device for this purpose, one in which the entire operation of gripping the tire and shrinking it is performed by the movement of a single lever.

Figure 1:
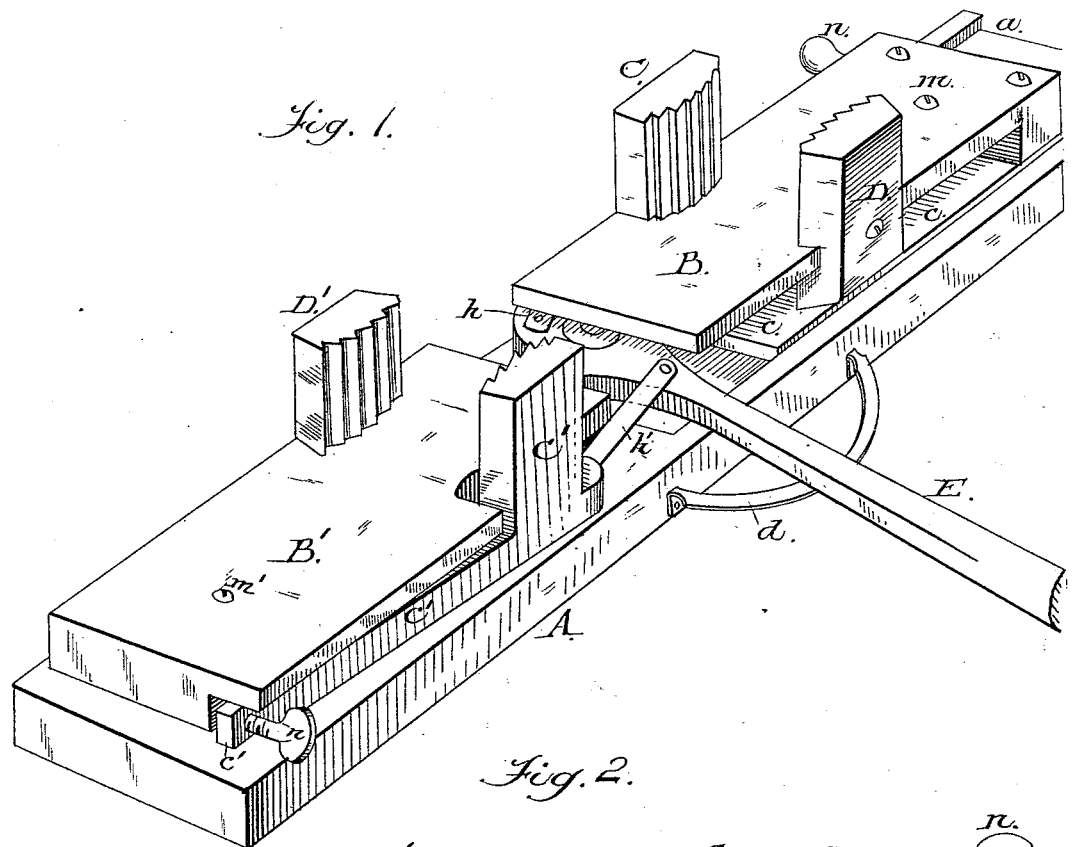
Figure 2:
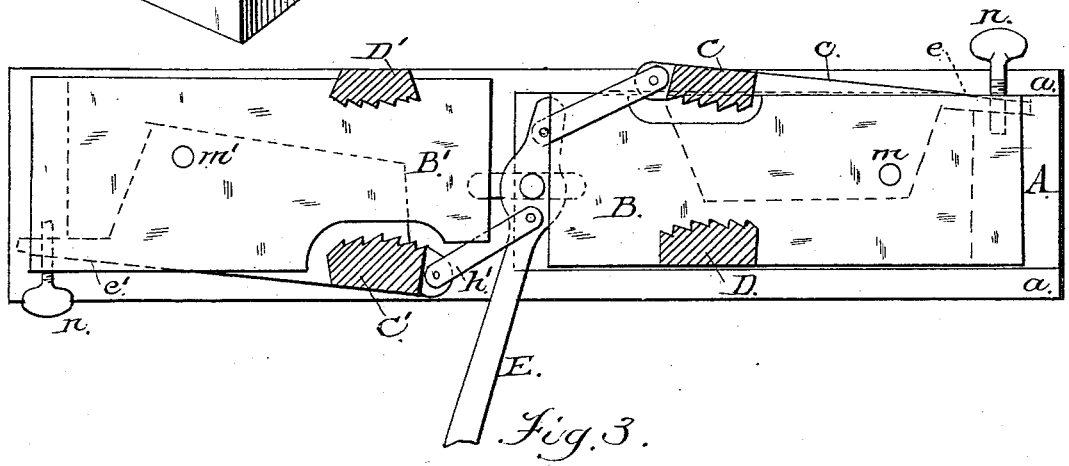
Figure 3:
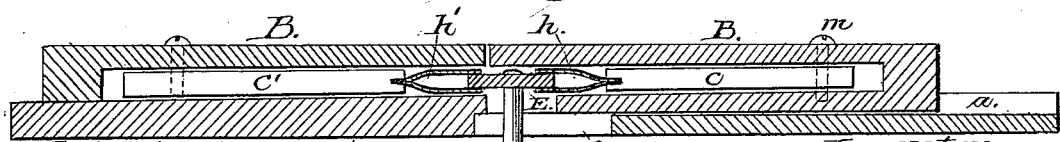

Referring to the accompanying drawings, Figure 1 is a perspective view of my invention, showing jaws slightly open and blocks separated. Fig. 2 is a plan of same. Fig. 3 is a longitudinal vertical section.

Let A represent a suitable bed-plate, having at one end beveled side guides, $a$.

B is the sliding block. This is fitted by means of beveled base-flanges into the guides $a$, and is thus adapted to be moved upon the bedplate. The block B is spaced or hollowed out, and has within it the plate $c$, from the edge of which a jaw, C, with a corrugated face, extends up by the edge of the block in a groove or notch made therein. The plate $c$ is pivoted in the block by a screw or pin, $m$, and has upon its sides, extending backwardly by the end wall of the block B, a tongue, $e$.

Secured to the edge of the sliding block B, opposite to the jaw C, is a fixed jaw, D, having also a corrugated face. Upon the other end of the bed-plate A is rigidly secured a stationary block, B', raised above the bed-plate sufficiently to allow the plate $c'$ to be pivoted under it by a pin or screw, $m'$. This plate has an upwardly-extending jaw, C', similar to jaw C. The plates $c\ c'$ are so pivoted and the jaws C C' so placed that these latter swing from opposite sides of the device. The plate $c'$ has also a tongue, $e'$, similar to tongue $e$.

A fixed jaw, D', is secured to the bed-plate and to the side of the block B', as shown.

E is the operating-lever. It is pivoted to the bed-plate about its center and between the two blocks B and B' and said plate. Its pivot-pin passes through an elongated slot, $o$, in the bed-plate.

A link or rod, $h$, connects the lever upon one side of the fulcrum or pivot with the outer end of plate $c$, and another link or rod, $h'$, connects it on the other side of the pivot with the end of plate $c'$.

A guide or way, $d$, is secured to the side of the bed-plate, as shown, for the lever E to rest upon to lend it support.

The blocks B B' may be halved into each other to still cover the lever E when the sliding block is moved away from the fixed one.

The operation of my device is as follows: The blocks being together and the jaws closed, I move the lever E. The points of connection of the links $h\ h'$ with the lever being out of line with and closer in than their points of connection with the plates $c\ c'$, the first action is to swing said plates outwardly, thus opening the jaws C C' away from the sides of their blocks. When the limit of this movement is reached, which is when the rear ends or tongues $e\ e'$ of the plates $c\ c'$ come in contact with the end wall of the blocks, the force of the lever is directed upon the block B to move it in its guides $a$ away from block B'. The two jaws C and D move with it. In this movement the pivot-point of the lever E must necessarily travel with the sliding block. The elongated slot $o$ in the bed plate provides for this. Taking now the tire, I insert it at the point desired between the jaws. I then reverse the lever E. The first effect is to straighten out the links $h\ h'$ and to swing inwardly plates $c\ c'$. This closes in the jaws C C', one on each side of the tire, and grips it between said jaws and the fixed jaws D D'. As soon as the jaws C C' are stopped the lever forces the sliding block, with its jaws C D, toward the fixed block and jaws C' D', thus upsetting the tire. The greater the force put upon the lever the stronger the jaws C C' grip the tire, so that if force enough be brought to bear to move the sliding block the jaws cannot slip on the tire, as they must first bind before the block moves. Consequently the greater the resistance which the sliding block presents to the lever the tighter the jaws grip. Therefore I do not confine myself to the guides $a$, but may employ any means by which I may regulate the friction of the sliding block upon the bed-plate. To limit the swinging movement of the jaws C'C'' or to fix them, I have set-screws $n$, passing through the tongues $e\, e'$ of the plates $c\, c'$ and impinging against the end walls of the blocks B B'.

Having thus described my invention, what I claim as new, and desire to secure by Letters Patent, is—

1. In a tire-upsetter, a stationary block having a fixed jaw, D', and a movable or swinging jaw, C'', in combination with a sliding block having a fixed jaw, D, and a movable or swinging jaw, C, as shown, between which the tire is gripped, and a means for swinging the movable jaws to grip the tire, and by the same movement to force the sliding block, with its jaws, toward the stationary block, consisting of the pivoted lever E and links $h\, h'$ for connecting said lever with movable jaws C C, substantially as herein described.

2. In a tire-upsetter, a plate, B', having upon it a fixed jaw, D', and an oppositely-placed movable jaw, C', pivoted to said plate B', in combination with a fixed jaw, D, and movable jaw C, both upon a sliding frame, and the means for moving the sliding frame, and by the same movement first swinging the jaws C C' to grip the tire, consisting of the lever E, pivoted through a slot, $o$, in the bed-plate, and the pivoted connecting rods or links $h\, h'$, connecting said lever on each side of its fulcrum with the movable jaws C C', all arranged and operating together substantially as herein described.

3. In a tire-upsetter, the bed-plate A, having at one end guides $a$, and the stationary block B', having a fixed jaw, D', a pivoted plate, $c'$, and a jaw, C'', attached to said plate, in combination with the sliding block B, fitted in guides $a$ and having a jaw, D, secured firmly thereto, a pivoted plate, $c$, and a jaw, C, attached to said plate, and the lever E upon the bed-plate A and having a traveling pivot-point, and the pivoted links or rods $h\, h'$, connecting the lever on each side of its fulcrum with the swinging plates $c\, c'$, all arranged and operating together substantially as herein described.

In witness whereof I hereunto set my hand.

WILLIAM VALENTINE.

Witnesses:
GEO. P. BENVIE,
J. N. CHAPPELL.